US010269157B2

(12) United States Patent
Furuya

(10) Patent No.: US 10,269,157 B2
(45) Date of Patent: Apr. 23, 2019

(54) TEMPLATE SELECTION SYSTEM, TEMPLATE SELECTION METHOD AND RECORDING MEDIUM STORING TEMPLATE SELECTION PROGRAM

(71) Applicant: FUJIFILM Corporation, Tokyo (JP)

(72) Inventor: Hiroyuki Furuya, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 71 days.

(21) Appl. No.: 15/163,328

(22) Filed: May 24, 2016

(65) Prior Publication Data
US 2017/0084066 A1 Mar. 23, 2017

(30) Foreign Application Priority Data

Sep. 18, 2015 (JP) .................................. 2015-185105

(51) Int. Cl.
G06K 9/00 (2006.01)
G06K 9/52 (2006.01)
G06T 11/60 (2006.01)

(52) U.S. Cl.
CPC .......... *G06T 11/60* (2013.01); *G06K 9/00221* (2013.01); *G06K 9/00302* (2013.01); *G06K 9/52* (2013.01); *G06K 2009/00322* (2013.01)

(58) Field of Classification Search
CPC .......... G06T 11/60; G06T 7/408; G06T 7/60; G06T 7/004; G06T 2207/30201;
(Continued)

(56) References Cited

U.S. PATENT DOCUMENTS 9,310,968 B2* 4/2016 Patel .................... G06F 3/04842
2006/0279555 A1 12/2006 Ono
(Continued)

FOREIGN PATENT DOCUMENTS

JP 3808231 B2 8/2006
JP 2007-026422 A 2/2007
(Continued)

OTHER PUBLICATIONS

An Office Action; "Notification of Reasons for Refusal," issued by the Japanese Patent Office dated Oct. 5, 2018, which corresponds to Japanese Patent Application No. 2015-185105 and is related to U.S. Appl. No. 15/163,328; with English language translation.

Primary Examiner — Menatoallah Youssef
(74) Attorney, Agent, or Firm — Studebaker & Brackett PC

(57) ABSTRACT

Provided are a template selection system, as well as a template selection method, and recording medium storing a template selection program, for selecting a template that will not appear incompatible with a target image when the target image is combined with the template. Specifically, a target image is selected and target image data representing the selected target image is transmitted to an image compositing server. An impression evaluation value of the target image is calculated and templates for which a discrepancy with respect to the calculated impression evaluation value is less than a threshold value are selected. The target image is combined with the templates and image data representing the resulting composite images are transmitted to a smartphone. A desired composite image is selected by the user from among the composite images displayed on the smartphone.

18 Claims, 19 Drawing Sheets

(58) Field of Classification Search
CPC ............ G06K 9/4652; G06K 9/00302; G06K 9/00228; G06K 9/52; G06K 2009/00322
See application file for complete search history.

(56) References Cited

U.S. PATENT DOCUMENTS

| | | | |
|---|---|---|---|
| 2009/0138788 A1* | 5/2009 | Hahn | G06F 19/321 715/200 |
| 2009/0142001 A1* | 6/2009 | Kuniyuki | G06K 9/00228 382/284 |
| 2011/0025709 A1 | 2/2011 | Ptucha et al. | |
| 2011/0029914 A1* | 2/2011 | Whitby | G06T 11/60 715/781 |
| 2012/0275713 A1 | 11/2012 | Yamanakajima | |
| 2016/0196584 A1* | 7/2016 | Franklin | G06Q 30/0267 705/14.64 |

FOREIGN PATENT DOCUMENTS

| | | |
|---|---|---|
| JP | 2010-026614 A | 2/2010 |
| JP | 2010-072699 A | 4/2010 |
| JP | 2012-164000 A | 8/2012 |
| JP | 2012-230649 A | 11/2012 |
| JP | 2013-500537 A | 1/2013 |
| JP | 2013-081208 A | 5/2013 |
| JP | 2014-016800 A | 1/2014 |
| JP | 2014-016819 A | 1/2014 |
| JP | 5387103 B2 | 1/2014 |
| JP | 2014-199641 A | 10/2014 |
| JP | 2015-162850 A | 9/2015 |

\* cited by examiner

*Fig. 5*

TABLE OF TEMPLATE IMPRESSION EVALUATION VALUES

| IMPRESSION / TEMPLATE | GENDER (MASCULINITY) | AGE (YOUTHFULNESS) | EXPRESSION (SERIOUSNESS) | FACE ORIENTATION (FRONTAL) |
|---|---|---|---|---|
| T1 | L6 | L3 | L7 | L8 |
| T2 | L7 | L4 | L8 | L5 |
| T3 | L3 | L8 | L4 | L3 |
| T4 | L4 | L7 | L4 | L4 |
| T5 | L2 | L8 | L2 | L7 |
| T6 | L5 | L5 | L6 | L5 |

Fig. 8

TABLE OF TARGET IMAGE IMPRESSION EVALUATION VALUES

| TARGET IMAGE \ IMPRESSION | GENDER (MASCULINITY) | AGE (YOUTHFULNESS) | EXPRESSION (SERIOUSNESS) | FACE ORIENTATION (FRONTAL) |
|---|---|---|---|---|
| I 1 | L 1 | L 8 | L 3 | L 8 |

TABLE OF TARGET IMAGE IMPRESSION EVALUATION VALUES

| IMPRESSION / TARGET IMAGE | GENDER (MASCULINITY) | AGE (YOUTHFULNESS) | EXPRESSION (SERIOUSNESS) | FACE ORIENTATION (FRONTAL) |
|---|---|---|---|---|
| I 1 (A 1) | L 1 | L 7 | L 3 | L 8 |

TABLE OF TARGET IMAGE IMPRESSION EVALUATION VALUES

| TARGET IMAGE \ IMPRESSION | GENDER (MASCULINITY) | AGE (YOUTHFULNESS) | EXPRESSION (SERIOUSNESS) | FACE ORIENTATION (FRONTAL) | VITALITY |
|---|---|---|---|---|---|
| I 1 (A 2) | L 2 | L 7 | L 3 | L 8 | L 7 |

Fig. 16

| COLOR DISTRIBUTION ID | COLOR DISTRIBUTION DATA | IMPRESSION ||||| TEMPLATE |
|---|---|---|---|---|---|---|
| | | GENDER (MASCULINITY) | AGE (YOUTHFULNESS) | EXPRESSION (SERIOUSNESS) | FACE ORIENTATION (FRONTAL) | |
| G1 | (R1, G1, B1) | L4 | L3 | L7 | L8 | T11, T16 |
| G2 | (R2, G2, B2) | L3 | L4 | L8 | L5 | T12 |
| G3 | (R3, G3, B3) | L7 | L8 | L5 | L3 | T13, T14, T15 |
| G4 | COLOR x (Rx, Gx, Bx) 80%<br>COLOR y (Ry, Gy, By) 10%<br>COLOR z (Rz, Gz, Bz) 10% | L3 | L2 | L5 | L7 | T20, T21 |

TEMPLATE SELECTION SYSTEM, TEMPLATE SELECTION METHOD AND RECORDING MEDIUM STORING TEMPLATE SELECTION PROGRAM

CROSS-REFERENCE TO RELATED APPLICATIONS

The present invention claims priority under 35 U.S.C. § 119 to Japanese Patent Application No. 2015-185105 filed Sep. 18, 2015. Each of the above application(s) is hereby expressly incorporated by reference, in its entirety, into the present application.

BACKGROUND OF THE INVENTION

Field of the Invention

The present invention relates to a template selection system, template selection method and recording medium storing a template selection program.

Description of the Related Art

There is a system available in which a user pastes a target image onto a template to generate a composite image desired by the user as in the manner of a postcard, electronic album or photo book. In a case where a composite image is generated, the composite image will appear odd if the color tone of the template and the color tone of the target image are too different. For this reason, the color tone of the template is adjusted (Patent Document 1). Consideration has been given to a system in which, based upon supplementary information representing the impression given by a template, a composite image is created by applying image processing of predetermined content in such a manner that the template and image to be combined with the template will take on a similar impression (Patent Document 2). A further system that has been considered is one which determines the aesthetic expression of a subject and utilizes the aesthetic expression to perform an image search (Patent Document 3).

Furthermore, there is a system which creates a layout automatically based upon user preference (Patent Documents 4, 5), a system in which a user selects a template and, based upon such feature quantities as luminance and saturation of an image that has been placed in a layout, selects a layout (Patent Document 6), and a system which presents a slideshow in which a single screen is provided with different impressions (Patent Document 7).

Patent Document 1: Japanese Patent Application Laid-Open No. 2013-81208
Patent Document 2: Japanese Patent No. 3808231
Patent Document 3: Japanese Patent No. 5387103
Patent Document 4: Japanese Patent Application Laid-Open No. 2014-199641
Patent Document 5: Japanese Patent Application Laid-Open No. 2014-16819
Patent Document 6: Japanese Patent Application Laid-Open No. 2014-16800
Patent Document 7: Japanese Patent Application Laid-Open No. 2010-26614

According to the description given in Patent Document 1, the fact that the color tone of a template is changed means that even if the user wishes to utilize the template having the color tone, the template cannot be used, and only color tone is taken into consideration. As a consequence, it is not possible to obtain a composite image in which compatibility is achieved between a target image and a template in which a feature other than color tone is taken into account. According to the description given in Patent Document 2, image processing the content of which is predetermined is executed in such a manner that a template and image to be combined with the template will take on a similar impression. As a consequence, the target image itself will differ from that before execution of such processing. According to the description given in Patent Document 3, the system merely performs an image search. According to the descriptions given in Patent Documents 4 and 5, since a layout is created automatically, a layout in line with user preference is not necessarily obtained. According to the description given in Patent Document 6, since a layout is selected based upon image luminance, saturation and the like, a layout cannot be selected from standpoints different from luminance and saturation. According to the description given in Patent Document 7, selection of a layout is not considered.

SUMMARY OF THE INVENTION

An object of the present invention is to select a template that matches the impression of a target image to be combined with a template.

A template selection system according to the present invention comprises: a template impression evaluation value storage unit for storing template impression evaluation values with regard to multiple templates; a target image impression evaluation value calculation unit for calculating an impression evaluation value of a target image to be combined with a template; and a template selection unit for selecting templates in order of increasing discrepancy (difference) between multiple template impression evaluation values stored in the template impression evaluation value storage unit and a target image impression evaluation value calculated by the target image impression evaluation value calculation unit.

The present invention provides also a template selection method. Specifically, the present invention comprises steps of: a template impression evaluation value storage unit storing impression evaluation values of templates with regard to multiple templates; a target image impression evaluation value calculation unit calculating an impression evaluation value of a target image to be combined with a template; and a template selection unit selecting templates in order of increasing discrepancy between multiple template impression evaluation values stored in the template impression evaluation value storage unit and a target image impression evaluation value calculated by the target image impression evaluation value calculation unit. The present invention provides also a recording medium storing a template selection program.

The template selection unit may be adapted so as to select a template having an impression evaluation value, from among the multiple template impression evaluation values stored in the template impression evaluation value storage unit, for which the discrepancy with respect to the impression evaluation value of the target image calculated by the target image impression evaluation value calculation unit is less than a threshold value. The system may further comprise a target image combining unit for generating composite images by combining the target image with the templates selected by the template selection unit.

The system may further comprise a first display control unit for causing composite images generated by the target image combining unit to be displayed on a display screen of a display unit.

By way of example, the first display control unit causes composite images generated by the target image combining unit to be displayed on the display screen of the display unit in order of increasing discrepancy between impression evaluation values of templates used in the composite images and the impression evaluation value of the target image.

The system may further comprise a second display control unit for causing templates selected by the template selection unit to be displayed on the display screen of the display unit.

For example, the second display control unit causes templates selected by the template selection unit to be displayed on the display screen of the display unit in order of increasing discrepancy.

The system may further comprise a face detection unit for detecting the face of a person included in the target image. In this case, by way of example, the target image impression evaluation value calculation unit calculates an impression evaluation value of the face of the person detected by the face detection unit.

For example, the target image impression evaluation value calculation unit calculates, from the face of the person detected by the face detection unit, an impression evaluation value with regard to at least one among gender, age, expression and face orientation of the person.

The system may further comprise a person detection unit for detecting a person included in the target image. In this case, by way of example, the target image impression evaluation value calculation unit calculates an impression evaluation value of the person detected by the person detection unit.

For example, the target image impression evaluation value calculation unit calculates, from the person detected by the person detection unit, an impression evaluation value with regard to vitality of the person.

By way of example, the target image impression evaluation value calculation unit calculates impression evaluation values of two or more types as vectors with regard to the target image, and the template impression evaluation value storage unit stores impression evaluation values of two or more types as vectors with regard to a template. In this case, the discrepancy with respect to the template is the vector-to-vector distance between the impression evaluation value of the target image and the impression evaluation value of the template.

By way of example, the impression evaluation value storage unit stores color distribution data with regard to multiple templates and stores template impression evaluation values in correspondence with the color distribution data.

The system may further comprise a template generation unit for generating multiple templates for which the color distribution data is identical. The impression evaluation value storage unit may be adapted so as to calculate color distribution data with regard to multiple templates and store template impression evaluation values in correspondence with the color distribution data.

The target image impression evaluation value calculation unit calculates impression evaluation values regarding respective ones of multiple target images, and the system further comprises an overall target image impression evaluation value calculation unit for calculating, from multiple impression evaluation values regarding the multiple target images calculated in the target image impression evaluation value calculation unit, an overall impression evaluation value representing overall evaluation of the multiple impression evaluation values regarding the multiple target images.

In this case, by way of example, the template selection unit uses the overall impression evaluation value as an impression evaluation value of a target image, which is a target for which discrepancies are to be found with respect to the impression evaluation values of multiple templates that have been stored in the impression evaluation value storage unit.

The system may further comprise a priority acceptance unit for accepting, from among multiple target images, order of priority of one or more target images to be combined with a template. In this case, by way of example, the overall target image impression evaluation value calculation unit calculates an overall target image impression evaluation value upon weighting an impression evaluation value, wherein the higher the priority of a target image the priority of which has been accepted by the priority acceptance unit, the greater the weighting applied.

The system may further comprise a priority acceptance unit for accepting, from among multiple target images in a case where multiple target images exist, order of priority of one or more target images to be combined with a template. In this case, by way of example, the target image combining unit combines images with a template, which has been selected by the template selection unit, in accordance with the order of priority accepted by the priority acceptance unit.

By way of example, the target image combining unit combines target images with image combining areas of large size in a selected template in accordance with a designated order of priority.

In accordance with the present invention, the impression evaluation value of a target image to be combined with a template is calculated. Template impression evaluation values are stored with regard to a plurality of templates. A template having an impression evaluation value, from among the stored impression evaluation values of the plurality of templates, for which the discrepancy with respect to the calculated impression evaluation value of the target image is less than a threshold value is selected. Thus the impression of the selected template and the impression of the target image will closely resemble each other. If the target image is combined with the selected template, therefore, a composite image having a coherent impression will be obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is an example of a table of template impression evaluation values;

FIG. 8 is an example of a table of target image impression evaluation values;

FIG. 16 is an example of a color distribution table;

DESCRIPTION OF THE PREFERRED EMBODIMENTS

Preferred embodiments of the present invention will now be described in detail with reference to the accompanying drawings.

Figure 1:
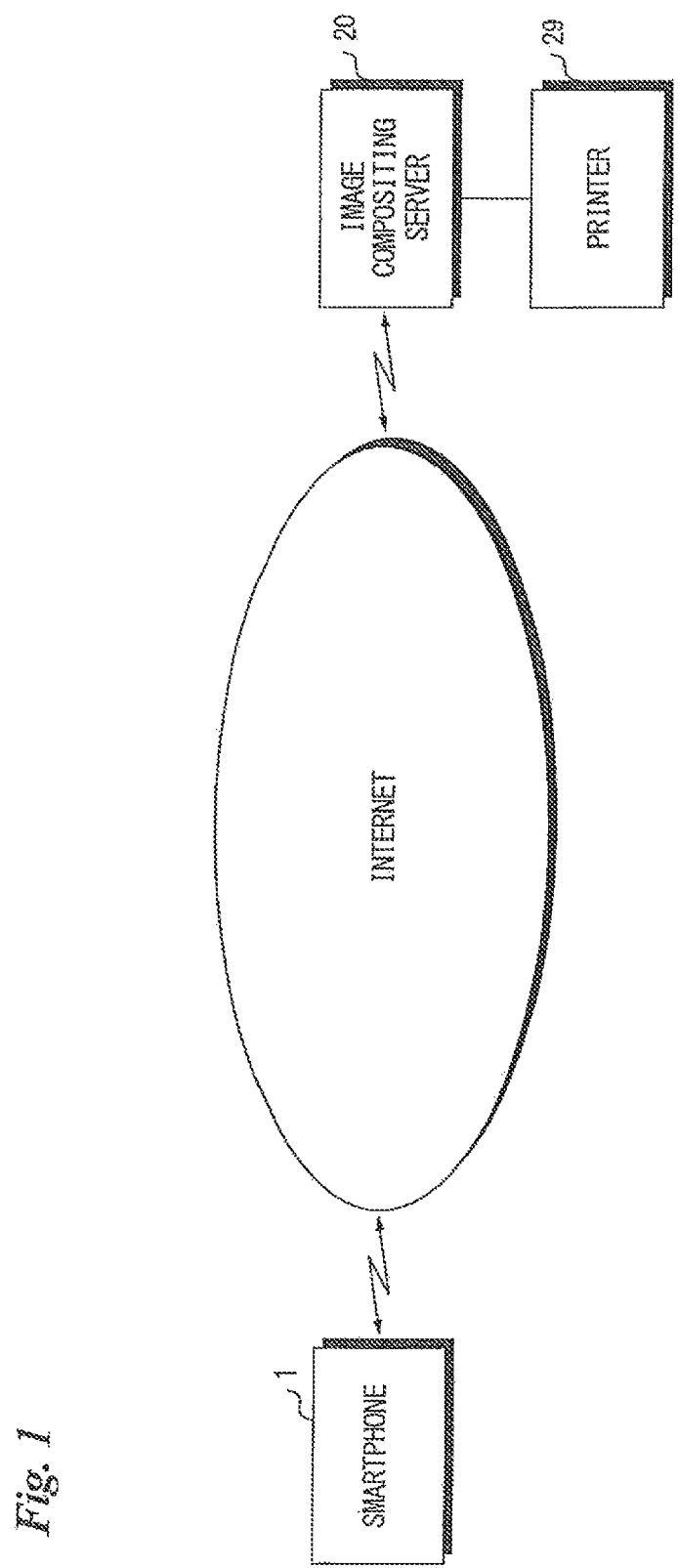
FIG. 1 illustrates an overview of an image compositing system.

FIG. 1 illustrates an embodiment of the present invention and shows an overview of an image compositing system.

In this embodiment, a case where a target image is combined with a template to thereby generate the composite image of a postcard will be described. However, the present invention is not limited to the generation of a postcard and can be applied to all systems of the kind that generate a composite image by combining a target image with a template as in the manner of an electronic album or other photo goods.

The image compositing system includes a smartphone (a multifunction mobile telephone) 1 and an image compositing server (template selection system) 20 that are capable of communicating with each other via a network such as the Internet. It goes without saying that the system can utilize a client computer or the like instead of the smartphone 1. Connected to the image compositing server 20 is a printer 29 for printing a postcard from image data representing a composite image generated in the image compositing server 20.

Figure 2:
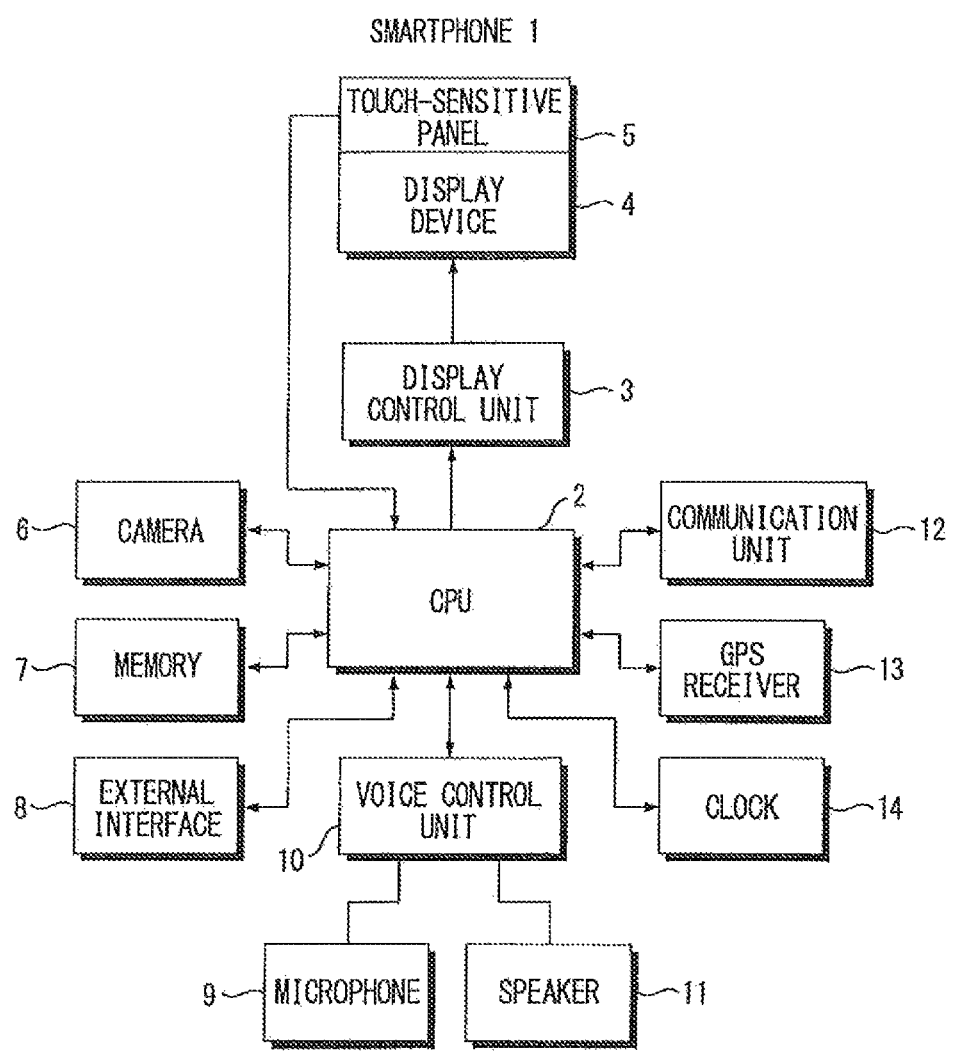
FIG. 2 is a block diagram illustrating the electrical configuration of a smartphone.

FIG. 2 is a block diagram illustrating the electrical configuration of the smartphone 1.

The overall operation of the smartphone 1 is controlled by a CPU (Central Processing Unit) 2.

The smartphone 1 includes a display device 4 controlled by a display control unit 3. A touch-sensitive panel 5 has been formed on the display screen of the display device 4. A command supplied from the touch-sensitive panel 5 is input to the CPU 2. The smartphone 1 further includes a camera 6, a memory 7 for storing data temporarily, and an external interface 8 for connecting to external devices. The smartphone 1 further includes a microphone 9, a voice control unit 10 and a speaker 11. The smartphone 1 further includes a communication unit 12 for connecting to the Internet as mentioned above, a GPS (Global Positioning System) receiver 13 for detecting the location of the smartphone 1, and a clock 14.

Figure 3:
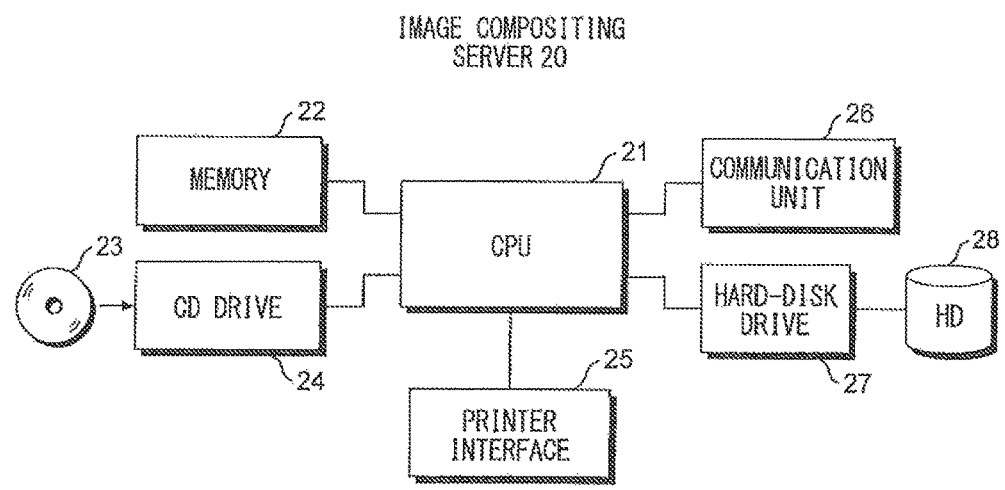
FIG. 3 is a block diagram illustrating the electrical configuration of an image compositing server.

FIG. 3 is a block diagram illustrating the electrical configuration of the image compositing server 20.

The overall operation of the image compositing server 20 is controlled by a CPU 21.

The image compositing server 20 includes a memory 22 for storing data temporarily, a compact-disc drive 24 for accessing a compact disc 23, and a printer interface 25 for connecting to the printer 29. The image compositing server 20 further includes a hard disk 28 and a hard-disk drive 27 for accessing the hard disk 28.

The compact disc (recording medium) 23 on which a program for controlling operation, described later, has been stored is loaded in the image compositing server 20 and the program that has been stored on the compact disc 23 is read by the compact-disc drive 24. By installing the read program in the image compositing server 20, the image compositing server 20 operates in a manner described later. It may be arranged so that the program that controls the image compositing server 20 is received by being transmitted over the Internet instead of being read from a recording medium such as the compact disc 23.

Figure 4:
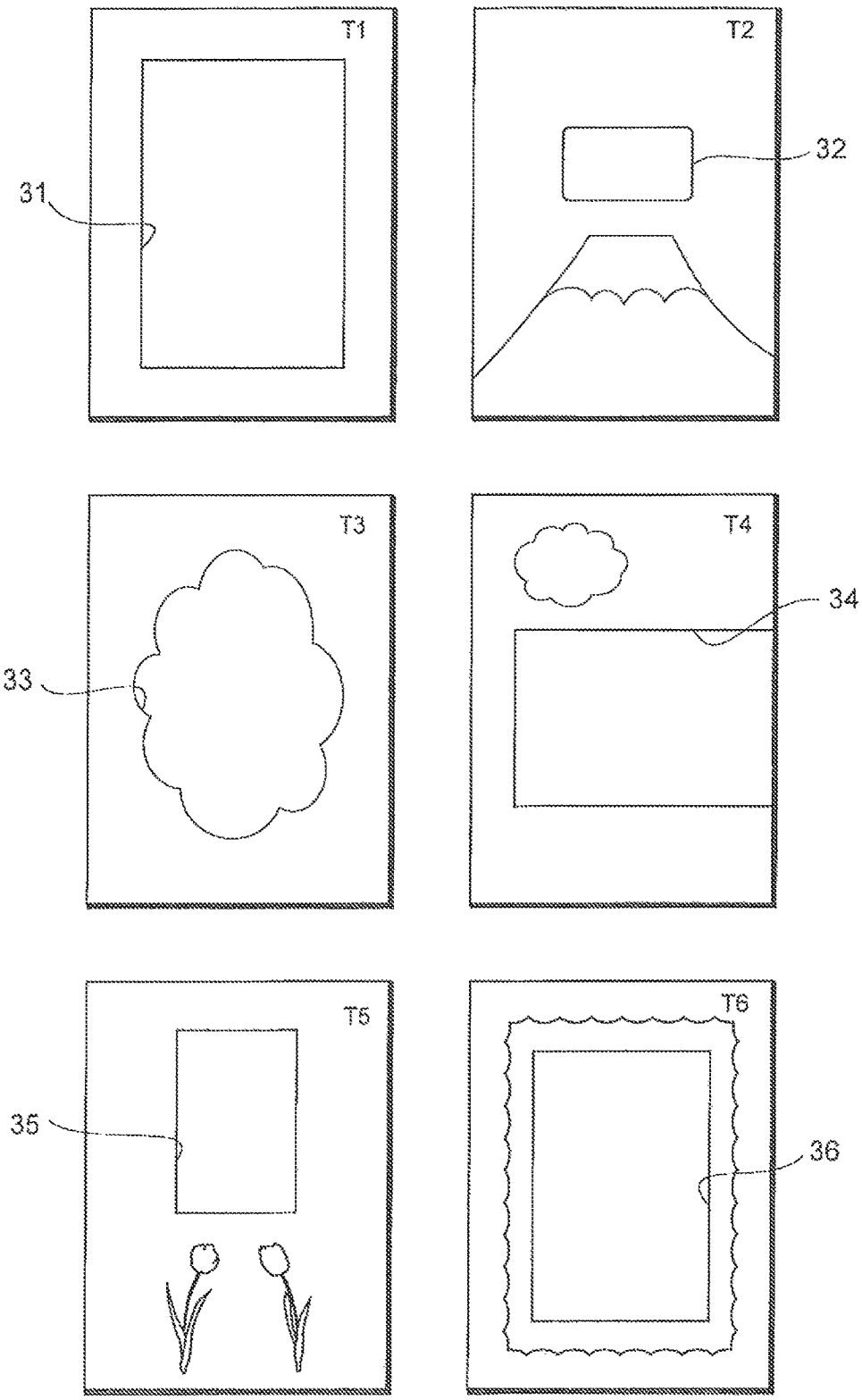
FIG. 4 shows examples of templates.

FIG. 4 shows examples of templates.

Although six templates T1 to T6 are illustrated as the templates in FIG. 4, it goes without saying that the number of templates may be more or less than six. Image data representing these templates T1 to T6 has been stored on the hard disk 28 of the image compositing server 20.

Combining areas (pasting areas) 31 to 36 with which respective target images (portions thereof) are to be combined have been formed in the template images T1 to T6, respectively. One template may be provided with multiple combining areas, not just one.

FIG. 5 is an example of a table of template impression evaluation values.

Template impression evaluation values have been stored in the memory 22 (a template impression evaluation value storage unit) in the form shown in FIG. 5.

Template impressions and template impression evaluation values have been stored in the table for template impression evaluation values on a per-template basis with regard to a plurality of templates. Four types of impression, namely gender (masculinity), age (youthfulness), expression (seriousness) and face orientation (frontal), are stipulated. However, impression evaluation values regarding less than four types or five or more types may just as well be stored in the table of template impression evaluation values.

The impression evaluation value of a template is decided based upon the gender, age, expression and face-orientation statistics of persons whose images are included in target images that have been combined with the combining area of the template thus far.

In a case where a template has already been utilized, the impression evaluation value of the template is decided based upon the gender, age, expression and face-orientation statistics of the persons whose images are included in the target images that have been combined with the combining area of the template. The impression evaluation value of a template may be decided based upon a questionnaire even if a target image has not been combined with the template. For example, the more a template is combined with the target image of a man, the higher the impression evaluation value of the template with regard to gender (masculinity); the more a template is combined with the target image of a woman, the lower the impression evaluation value of the template with regard to gender (masculinity). Similarly, the more a template is combined with the target image of a young person, the higher the impression evaluation value of the template with regard to age (youthfulness); the more a template is combined with the target image of an elderly person, the lower the impression evaluation value of the template with regard to age (youthfulness). The more a template is combined with the target image of a person of serious expression, the higher the impression evaluation value of the template with regard to expression (seriousness); the more a template is combined with the target image of person of gentle expression, the lower the impression evaluation value of the template with regard to expression (seriousness). Further, the more a template is combined with the target image of a person whose face orientation is frontal, the higher the impression evaluation value of the template with regard to face orientation (frontal); the more a template is combined with the target image of a person whose face orientation is sideways, the lower the impression evaluation value of the template with regard to face orientation (frontal). In the table of template impression evaluation values shown in FIG. 5, ten stages are stipulated as the numerical values of impression evaluation values (for example, in the case of the impression "GENDER" regarding template T1, the numerical value is L6) (the number of stages may just as well be less than ten). The higher the numerical value, the higher the impression evaluation value. Impression evaluation values may be normalized to between 0 and 1, and weighting may be applied so as to raise (lower) a specific impression evaluation value.

The table of template impression evaluation values shown in FIG. 5 contains impression evaluation values for each and every impression with regard to the four types of impression, namely gender (masculinity), age (youthfulness), expression (seriousness) and face orientation (frontal). Therefore, in a case where coordinate axes are considered regarding the four types of impression, it can be construed that the table contains coordinate values on these coordinate axes, and it can be construed that the impression evaluation values are stored as vectors.

Figure 6:
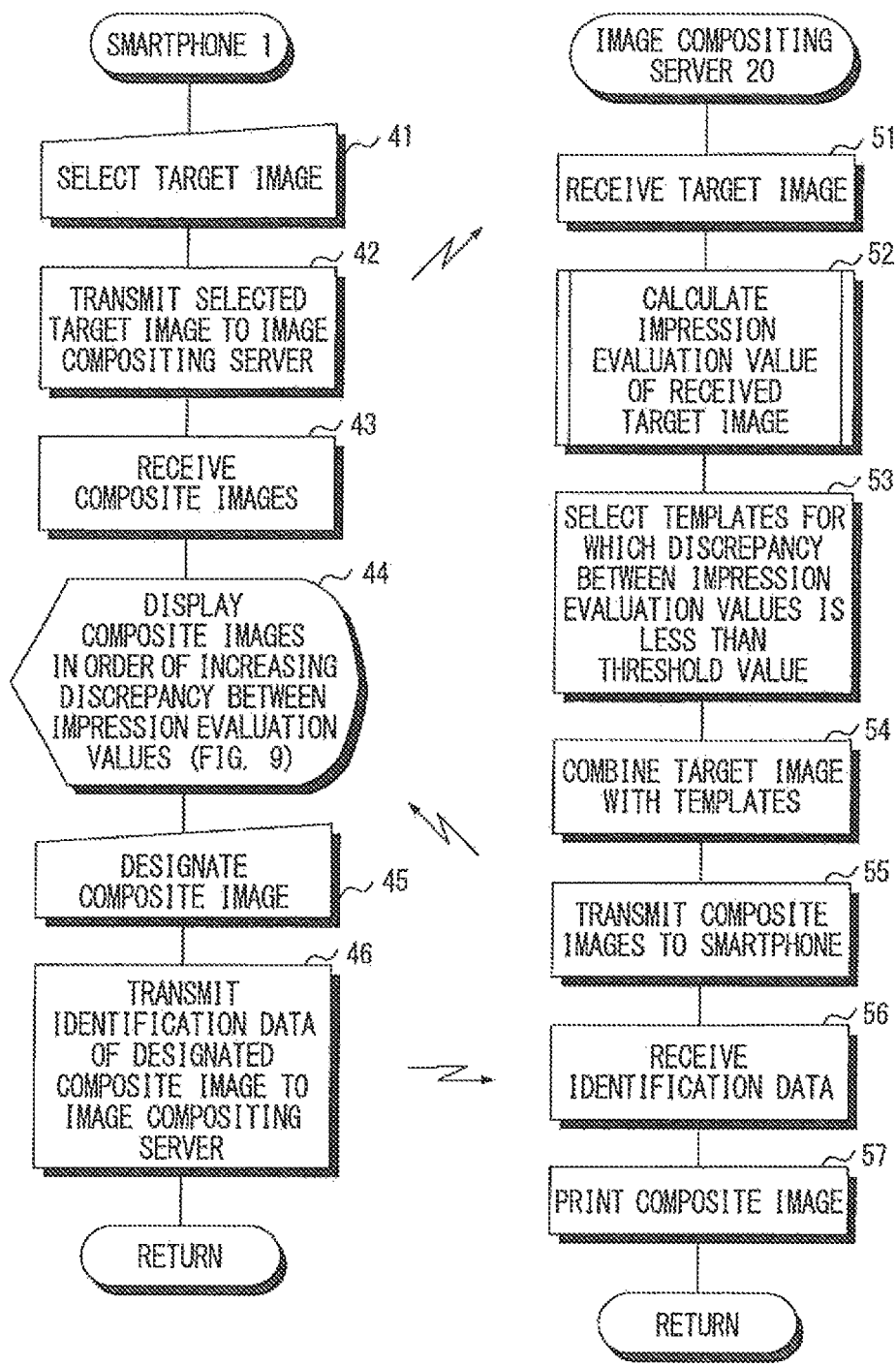
FIG. 6 is a flowchart illustrating processing executed by the image compositing system.

FIG. 6 is a flowchart illustrating processing executed by the image compositing system.

The user operates the smartphone 1 and selects a target image, which is to be combined with a template, from among a number of images that have been stored in the smartphone 1 (step 41).

Figure 7:
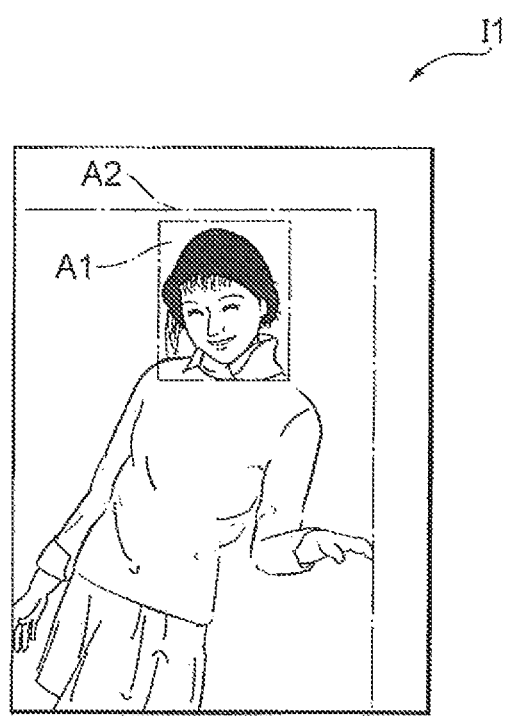
FIG. 7 is an example of a target image.

FIG. 7 is an example of a target image I1 selected by the user.

Target image data representing the selected target image I1 is transmitted from the smartphone 1 to the image compositing server 20 (step 42).

The target image data transmitted from the smartphone 1 is received by the image compositing server 20 (step 51). Impression evaluation values of the target image I1 are calculated by the CPU 21 (target image impression evaluation value calculation unit) of the image compositing server 20 (step 52).

FIG. 8 is an example of a table of target image impression evaluation values regarding the target image I1.

In a manner similar to that of the template, impression evaluation values regarding impressions, namely gender (masculinity), age (youthfulness), expression (seriousness) and face orientation (frontal), are calculated.

Consider the impression evaluation value for gender (masculinity) with regard to a target image. In a case where a person is included in the target image, an average face is prepared in advance for each gender, matching processing is performed between the average face for each gender and the face of the person included in the target image, and the higher the degree of similarity with the average face of masculinity, the higher the impression evaluation value for gender (masculinity) is made. Further, if not only the person's face but also the clothing being worn by the person is detected and, for example, a blouse or skirt is being worn, the impression evaluation value for gender (masculinity) is lowered; if a necktie is being worn, then the impression evaluation value for gender (masculinity) is raised. Further, if hair is detected and the hair length is long, the impression evaluation value for gender (masculinity) is lowered; if the hair length is short, the impression evaluation value for gender (masculinity) is raised.

Further, consider the impression evaluation value for age (youthfulness) with regard to a target image. In a case where a person is included in the target image, an average face is prepared in advance for each age bracket, matching is performed between the average face for each age bracket and the face of the person included in the target image, and the age bracket for which the degree of similarity is the greatest is adopted as the age bracket of the person included in the target image. The younger the age bracket, the higher the target image impression evaluation value for age (youthfulness); the higher the estimated age bracket, the lower the target image impression evaluation value for age (youthfulness).

Furthermore, the impression evaluation value for expression (seriousness) with regard to a target image can be calculated by ascertaining whether both eyes of the person are open or not, whether the shape of the person's mouth is curved or not, etc. For example, if both eyes are open, the impression evaluation value for expression (seriousness) rises; if the shape of the mouth is curved the impression evaluation value for expression (seriousness) falls.

Furthermore, the impression evaluation value for face orientation (frontal) with regard to a target image can be calculated based upon the positions of the eyes, nose and mouth. If both eyes are visible, the face orientation is considered to be frontal. If only one eye of both eyes is visible, then the face orientation is considered to be sideways. Further, if the nose or mouth is close to the center of the face, the face orientation is considered to be frontal, but if the nose or mouth is off-center with regard to the face, then the face orientation is considered to be sideways.

The table of target image impression evaluation values shown in FIG. 8 can be thought of as containing impression evaluation values that correspond to coordinate values obtained by taking respective ones of the four types of impression evaluation value as axes in a manner similar to the table of template impression evaluation values shown in FIG. 5. Accordingly, impression evaluation values of the four types (two or more types) are calculated by the CPU 21 as vectors with regard to the target image.

Thus, the impression evaluation values regarding a target image are calculated by the CPU 21 and the calculated impression evaluation values are stored in the table of target image impression evaluation values. The table of impression evaluation values is stored in the memory 22.

Next, from among the impression evaluation values of a plurality of templates contained in the table of template impression evaluation values stored in memory 22, the CPU 21 (template selection unit) selects a template having an impression evaluation value for which the discrepancy with respect to the calculated impression evaluation value of the target image is less than a threshold value (step 53). The discrepancy is the sum or product of the absolute values of differences between impression evaluation values of a target image and impression evaluation values of a template with regard to impressions of the same type. For example, if the discrepancy between the impression evaluation value of the template T1 and the impression evaluation value of the target image I1 is a sum, then we have discrepancy=|impression evaluation value for gender of template T1−impression evaluation value for gender of target image I1|+|impression evaluation value for age of template T1−impression evaluation value for age of target image I1|+|impression evaluation value for expression of template T1−impression evaluation value for expression of target image I1|+|impression evaluation value for face orientation of template T1−impression evaluation value for face orientation of target image I1|=|L6−L1|+|L3−L8|+|L7−L3|+|L8−L8|=L14. Discrepancies with respect to the impression evaluation values of the target image I1 can be calculated in a similar manner with regard to the other templates T2 to T6.

Further, since the impression evaluation values regarding templates contained in the table of template impression evaluation values shown in FIG. 5 and the impression evaluation values regarding target images contained in the table of target image impression evaluation values are all considered to be vectors, a discrepancy may be taken to be the vector-to-vector distance between the impression evaluation value of the target image and the impression evaluation value of the template. The discrepancy between the impression evaluation value of the template T1 and impression evaluation value of the target image I1 in this case is discrepancy=√{(impression evaluation value for gender of template T1−impression evaluation value for gender of target image I1)²+(impression evaluation value for age of template T1−impression evaluation value for age of target image I1)²+(impression evaluation value for expression of template T1−impression evaluation value for expression of target image I1)²+(impression evaluation value for face orientation of template T1−impression evaluation value for face orientation of target image I1)²}=√{(L6−L1)²+(L3−L8)²+(L7−L3)²+(L8−L8)²=L8. Discrepancies with respect to the impression evaluation values of the target image I1 can be calculated in a similar manner with regard to the other templates T2 to T6.

When discrepancies are calculated, templates are selected by the CPU 21 (template selection unit) in order of increasing discrepancy (step 53). For example, assume that the discrepancy between the impression evaluation values of template T5 and target image I1 is the smallest, the discrepancy between the impression evaluation values of template T3 and target image I1 is the next smallest, and the discrepancy between the impression evaluation values of template 14 and target image I1 is the next smallest. In this case, the CPU 21 (target image combining unit) combines the target image I1 with the combining areas 35, 33 and 34 of the selected templates T5, T3 and 14 to thereby generate composite images (step 54). The composite image data representing the generated composite images is transmitted from the image compositing server 20 to the smartphone 1 (step 55). Naturally, it may be arranged so that templates for which the discrepancies with regard to the impression evaluation value of the target image I1 are less than a threshold value are simply selected.

When the composite image data transmitted from the image compositing server 20 is received by the smartphone 1 (step 43), the composite images are displayed on the display screen of the smartphone 1 in order of increasing discrepancy between the impression evaluation values (step 44). Not only is composite image data sent from the image compositing server 20 to the smartphone 1, but so is data indicating the order of the discrepancies or data indicating the values of the discrepancies and a display command. On the basis of this data, composite images are displayed on the display screen of the smartphone 1 in order of increasing discrepancy between the impression evaluation values. The transmission of the composite image data, data indicating the order of the discrepancies or data indicating the values of the discrepancies and the display command causes the composite images to be displayed on the display screen of the smartphone 1 (display device) by the CPU 21 (first display control unit).

Figure 9:
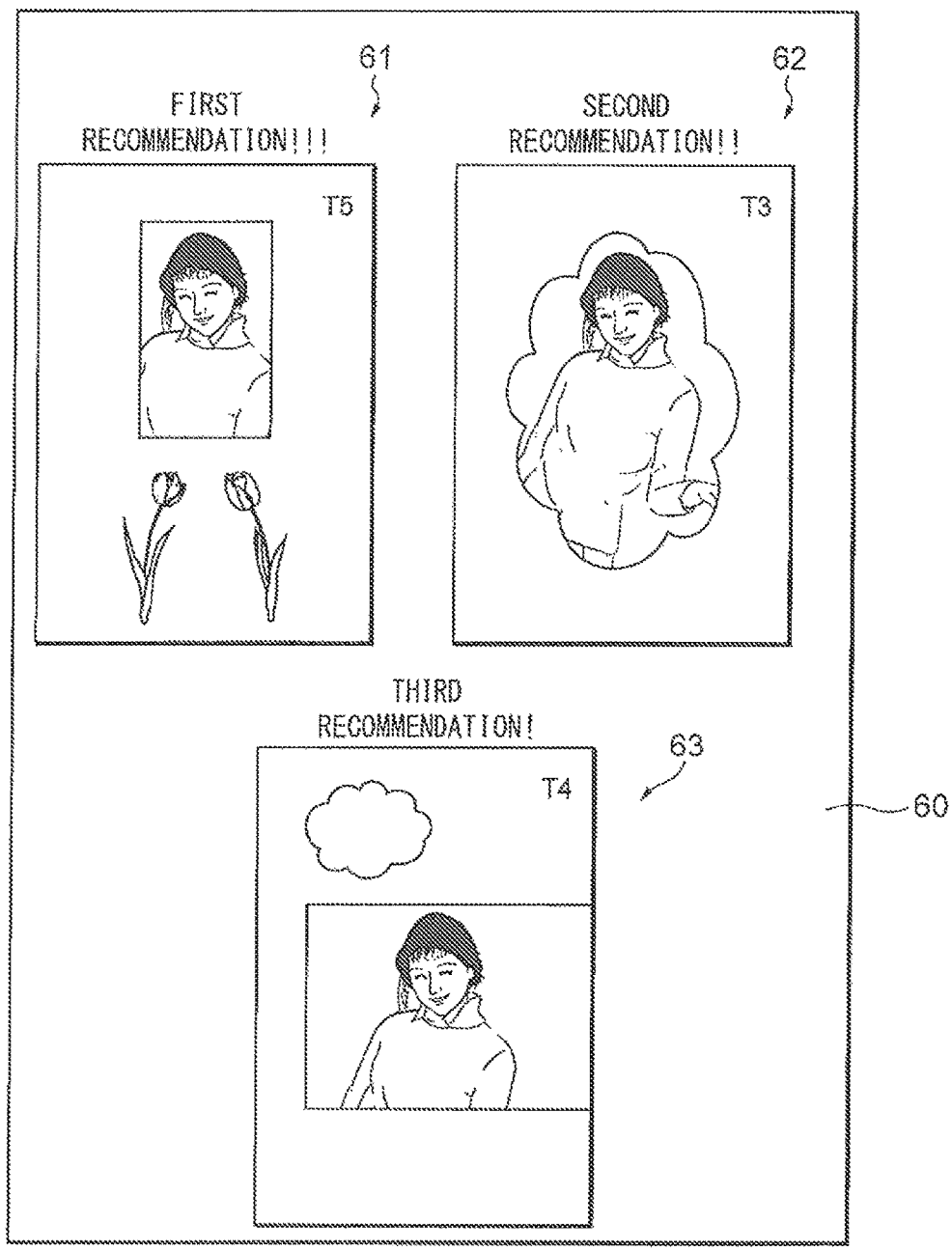
FIG. 9 is an example of a smartphone display screen.

FIG. 9 is an example of a display screen 60 of the smartphone 1.

Composite images 61, 62 and 63 are being displayed on the display screen 60. The composite images 61, 62 and 63 are being displayed in order of increasing discrepancy between the impression evaluation values of the templates T5, T3 and T4, which constitute the composite images 61, 62 and 63, and the impression evaluation value of the target image I1. The composite images 61, 62 and 63 are the result of combining the target image I1 with templates T5, T3 and T4, respectively. Since the discrepancy with respect to the impression evaluation value of target image I1 is smallest for template T5, the composite image 61 is the one recommended first. Since the discrepancy with respect to the impression evaluation value of target image I1 is the next smallest for template T3, the template T3 is the second recommended. Since the discrepancy with respect to the impression evaluation value of target image I1 is the next smallest for template 14, the template 14 is the third recommended. Of course, the composite images need not be displayed in order of increasing discrepancy.

By touching the desired composite image among the composite images 61, 62 and 63 being displayed on the display screen 60, the user designates the composite image (step 45). In response, identification data identifying the designated composite image is transmitted from the smartphone 1 to the image compositing server 20 (step 46).

When the identification data sent from the smartphone 1 is received by the image compositing server 20 (step 56), the composite image specified by the received identification data is printed by the printer 29 (step 57). The printed composite image is delivered to the residence of the user.

Figure 10:
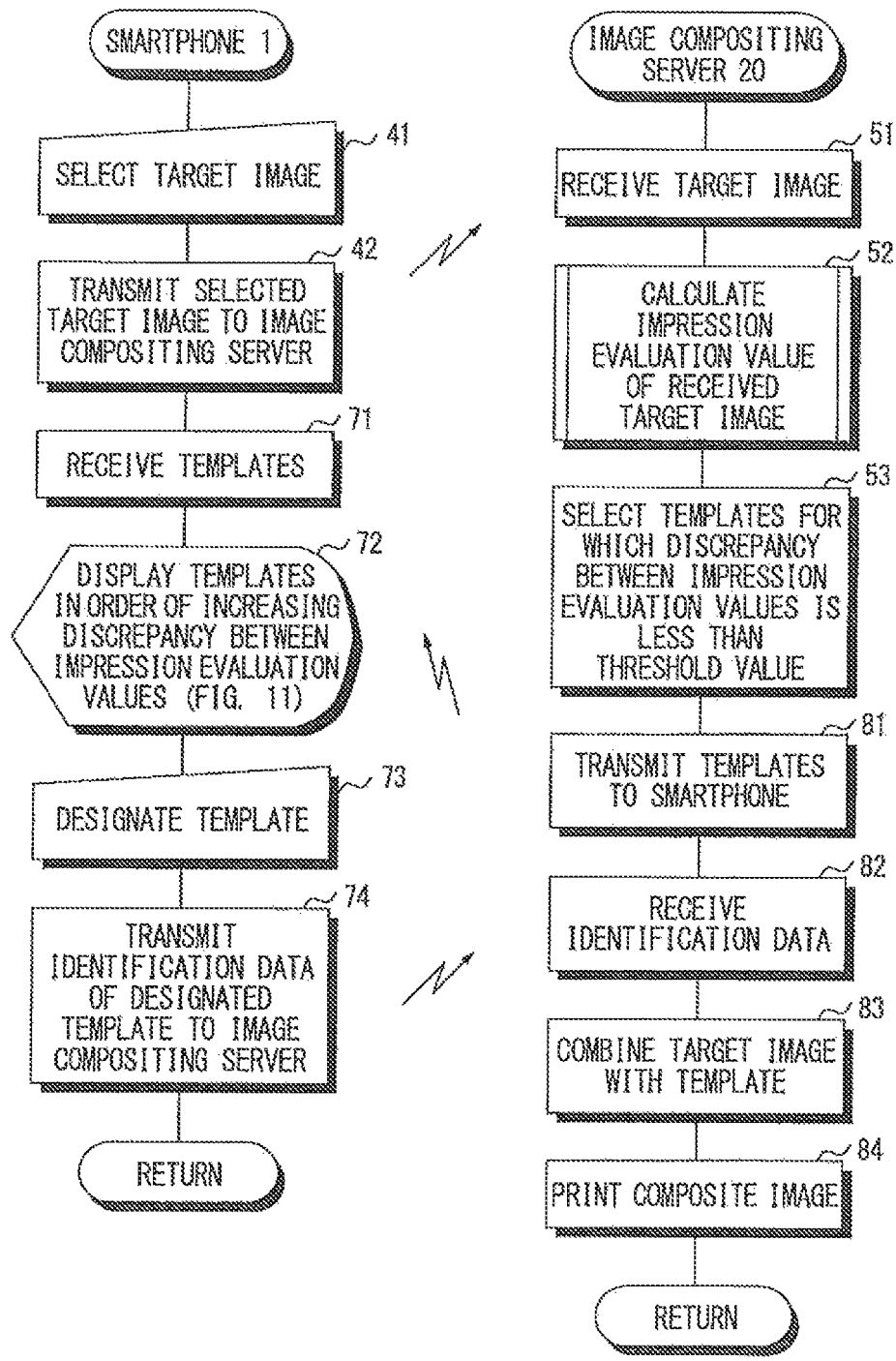
FIG. 10 is a flowchart illustrating processing executed by the image compositing system.
Figure 11:
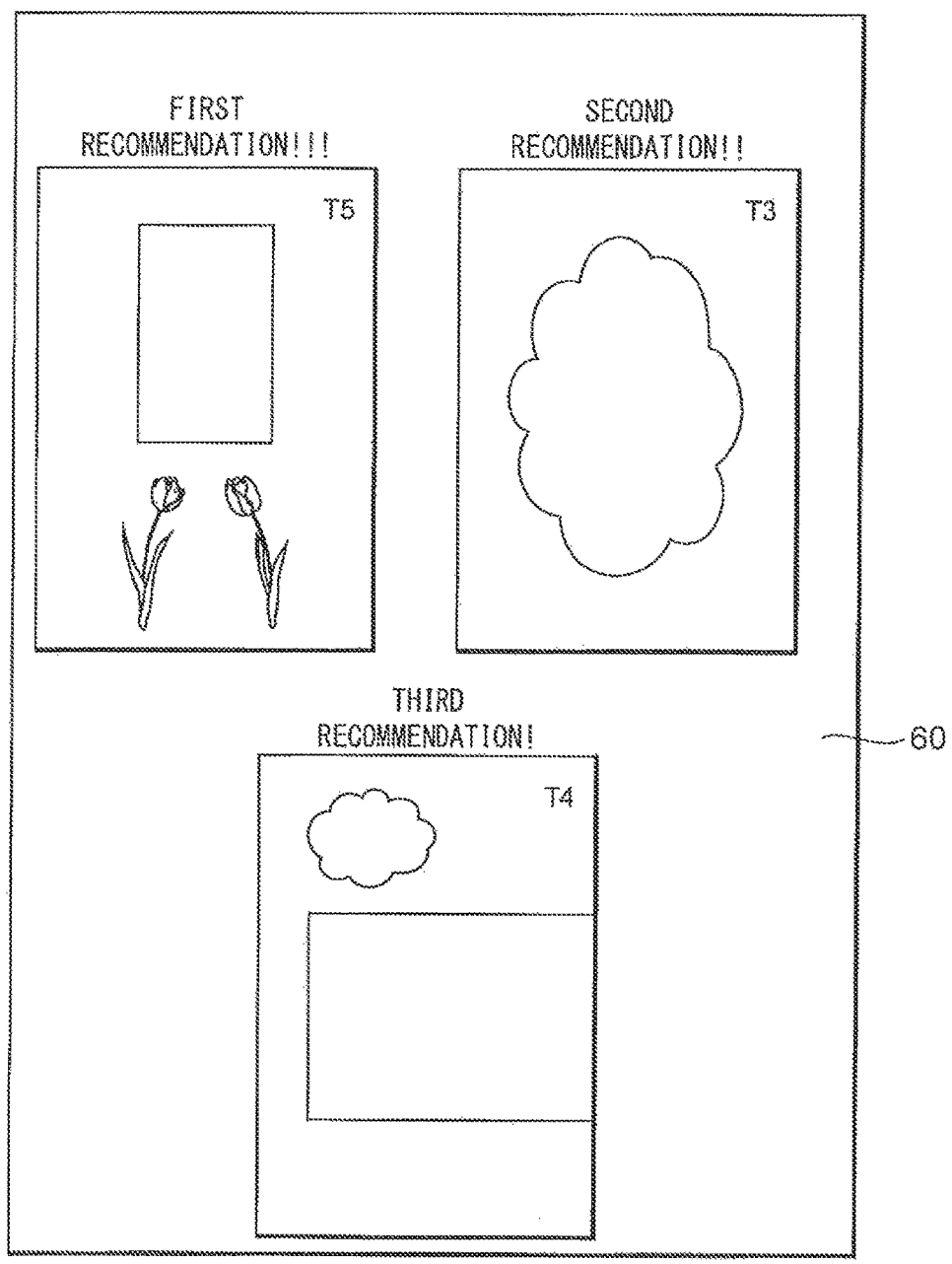
FIG. 11 is an example of a smartphone display screen.

FIGS. 10 and 11 illustrate an embodiment, in which FIG. 10, which shows processing executed by the image compositing system, is a flowchart corresponding to the flowchart of FIG. 6. Processing steps illustrated in FIG. 10 identical with those shown in FIG. 6 are designated by like step numbers. FIG. 11 is an example of the display screen 60 of the smartphone 1.

The target image I1 to be combined with a template is selected (it is assumed here that the target image I1 has been selected) by the user (step 41) and target image data representing the selected target image I1 is transmitted from the smartphone 1 to the image compositing server 20 (step 42). When the target image data is received by the image compositing server 20 (step 51), the impression evaluation value of the target image I1 is calculated (step 52) and the CPU 21 selects the template for which the discrepancy with respect to the impression evaluation value of the target image I1 is less than a threshold value (step 53). As in the processing shown in FIG. 6, it will be assumed that the templates T5, T3 and T4 have been selected. In response, template image data representing each of the selected templates T5, T3 and T4 is transmitted from the image compositing server 20 to the smartphone 1 (step 81).

When the template image data sent from the image compositing server 20 is received by the smartphone 1 (step 71), template images are displayed on the display screen of the smartphone 1 in order of increasing discrepancy between impression evaluation values (step 72). Not only is template image data sent from the image compositing server 20 to the smartphone 1, but so is data indicating the order of the discrepancies or data indicating the values of the discrepancies and a display command. On the basis of this data, template images are displayed on the display screen of the smartphone 1 in order of increasing discrepancy between the impression evaluation values. The transmission of the template image data, data indicating the order of the discrepancies or data indicating the values of the discrepancies and the display command causes the template images to be displayed on the display screen of the smartphone 1 (display device) by the CPU 21 (second display control unit).

FIG. 11 is an example of a display screen 60 of the smartphone 1.

The templates T5, T3 and T4 are being displayed on the display screen 60. The templates T5, T3 and T4 are being displayed in order of increasing discrepancy between the impression evaluation values of the templates and the impression evaluation value of the target image I1. Since the discrepancy with respect to the impression evaluation value of target image I1 is smallest for template T5, the composite image 61 is the one recommended first. Since the discrepancy with respect to the impression evaluation value of target image I1 is the next smallest for template T3, the template T3 is the second recommended. Since the discrepancy with respect to the impression evaluation value of target image I1 is the next smallest for template 14, the template 14 is the third recommended. Of course, the templates need not be displayed in order of increasing discrepancy.

By touching the desired template from among the templates T5, T3 and 14 being displayed on the display screen 60, the user designates the template (step 73). In response, identification data identifying the designated template is transmitted from the smartphone 1 to the image compositing server 20 (step 74).

When the identification data sent from the smartphone 1 is received by the image compositing server 20 (step 82), the CPU 21 (target image combining unit) combines the target image I1 with the combining area of the template specified by the received identification data (step 83). The composite image is printed by the printer 29 (step 84). The printed composite image is delivered to the residence of the user.

Since the target image I1 has been stored in the smartphone 1, the selected target image I1 may be combined with each of the templates T5, T3 and 14 in the smartphone 1 in a case where the templates T5, T3 and 14 are being displayed in the manner shown in FIG. 11. In response, the composite images 61, 62 and 63 of the kind shown in FIG. 9 are displayed on the display screen 60 of the smartphone 1. Merely displaying the templates T5, T3 and 14 would make it difficult to imagine what the composite images 61, 62 and 63 will look like, but since the composite images 61, 62 and 63 are displayed, the user can grasp at a glance what the images will look like after the target image I1 has been combined with the templates T5, T3 and T4.

Figures 12, 13:
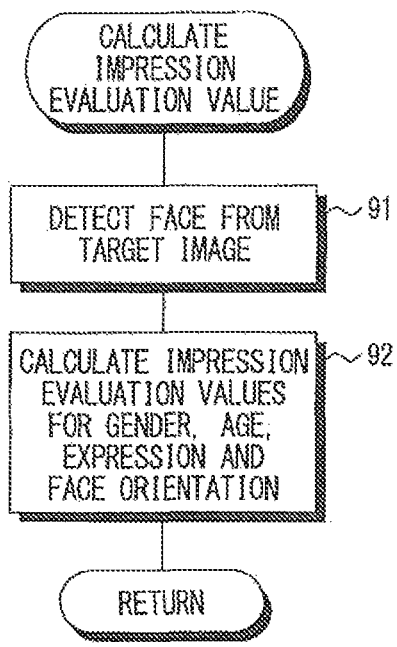
FIG. 12 is a flowchart illustrating processing for calculating impression evaluation values.
FIG. 13 is an example of a table of target image impression evaluation values.

FIG. 12 is a flowchart illustrating processing for calculating the impression evaluation values of a target image (namely the processing executed at step 52 in FIGS. 5 and 10). FIG. 13 illustrates a table of target image impression evaluation values and corresponds to FIG. 8.

The above-described embodiment is such that, in a case where a target image has been selected, the impression evaluation value of the target image is calculated from the entire target image selected. In the processing shown in FIG. 12, however, face A1 (see FIG. 7) included in the target image is detected by the CPU 21 (face detection unit) from within a selected target image (step 91), and an impression evaluation value (at least one impression evaluation value among gender, age, expression and face orientation) regarding the face is calculated by the CPU 21 from the detected face (step 92). From among the face impression evaluation values, those regarding gender and age are calculated based upon degree of similarity obtained by matching with an average face of faces of each gender. However, since an impression evaluation value is calculated based upon a detected face, items such as clothing being worn by the person in the target image are not utilized in the calculation of impression evaluation value, unlike the case where gender and age impression evaluation values are calculated from the entirety of the target image. The same would hold true for the expression and face-orientation impression evaluation values as with the case where calculation is based upon the entirety of the target image. Naturally, in a case where the expression and face-orientation impression evaluation values are calculated from the entire target image, if these are calculated utilizing conditions other than the face, then the impression evaluation values obtained in a case where the expression and face-orientation impression evaluation values are calculated from a face would differ from those obtained in a case where the expression and face-orientation impression evaluation values are calculated from the entire target image.

When the impression evaluation values are calculated by the CPU 21, the table of target image impression evaluation values is generated. The calculated impression evaluation values are stored in the generated table of target image impression evaluation values. The table of impression evaluation values shown in FIG. 13 is also stored in the memory 22.

The template selection processing shown at step 53 in FIG. 6 or FIG. 10 is executed using the impression evaluation values thus generated.

Figures 14, 15:
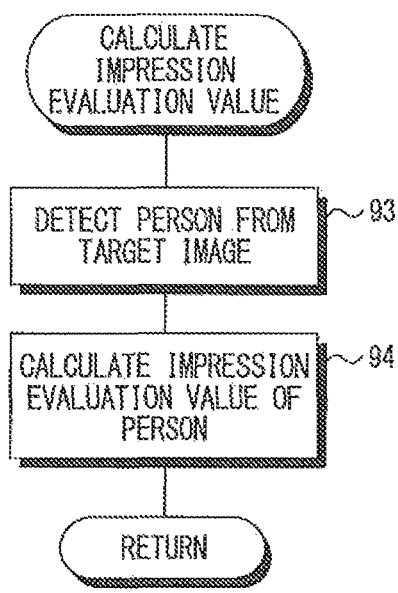
FIG. 14 is a flowchart illustrating processing for calculating impression evaluation values.
FIG. 15 is an example of a table of target image impression evaluation values.

FIG. 14 is another flowchart illustrating processing for calculating the impression evaluation values of a target image (namely the processing executed at step 52 in FIGS. 5 and 10), and corresponds to FIG. 12. FIG. 15 illustrates a table of target image impression evaluation values and corresponds to FIGS. 8 and 13.

The processing illustrated in FIG. 12 is such that, in a case where a target image has been selected, the impression evaluation value of the target image is calculated from the entire target image selected. In the processing shown in FIG. 14, however, person A2 (see FIG. 7) included in the target image is detected by the CPU 21 (person detection unit) from within a selected target image (step 93), and an impression evaluation value (at least one impression evaluation value among gender, age, expression, face orientation and vitality) regarding the person is calculated by the CPU 21 from the detected person (step 94).

With regard to the impression evaluation value for vitality, the images of a number of persons are extracted in advance, an impression evaluation value for vitality is calculated for every pose of each person, matching is performed with respect to the pose of a person included in a target image, and the impression evaluation value of vitality regarding the pose that is similar is obtained for that person. In a case where vitality is calculated, impression evaluation values of vitality would have been calculated with regard to templates as well. In a manner similar to the impression evaluation value for gender or the like, the impression evaluation value for vitality with regard to a template can also make use of the impression evaluation value for vitality of a target image used as the target image to be combined with this template.

Further, from among the impression evaluation values of a person, calculation with regard to gender and age is performed based upon matching with an average face of faces of each gender and degree of similarity of clothing worn by the person on a per-gender basis. The impression evaluation value for an expression would be calculated in the same manner as when calculation is performed based upon the entire target image. The impression evaluation value for face orientation would be calculated utilizing the orientation of the entire body as well. For example, if the entire body is facing forward, the face also would be considered to be facing toward the front, and if the entire body is facing sideways, then the face also would be considered to be facing sideways. The same would hold true in a case where calculation is performed based upon the entirety of the target image.

When the impression evaluation values are calculated by the CPU 21, the table of target image impression evaluation values is generated. The calculated impression evaluation values are stored in the generated table of target image impression evaluation values. The table of impression evaluation values shown in FIG. 15 also is stored in memory 22.

Template selection processing at step 53 shown in FIG. 6 or FIG. 10 is executed using the impression evaluation values thus generated.

In a case where impression evaluation values regarding a target image are calculated from respective ones of the entire target image, face and person, it may be arranged so that at least two of these values are selected from among the entire image, face and person, an average impression evaluation value is calculated for each of these impressions and the average value of the impression evaluation value is utilized to calculate the discrepancy with respect to the impression evaluation value of the target image.

FIG. 16 illustrates another embodiment and is an example of a color distribution table (table of impression evaluation values).

The color distribution table has been stored in the memory 22 (impression evaluation value storage unit) of the image compositing server 20.

Color distribution data specified by a color distribution ID (identification) has been stored in the color distribution table. The color distribution data is data represented by R (red), G (green) and B (blue) (although the data may be represented by other colors, such as cyan, magenta and yellow). Contained in the color distribution table in correspondence with the color distribution data are impression evaluation values regarding impressions given by templates that have such color distribution data. The color distribution table further contains templates (template IDs), which are among the templates that have been stored in the image compositing server 20, that have color distributions (which may be regarded as being approximately the same) corresponding to the color distribution data. For example, it will be understood that templates T11 and T16 have been stored in the image compositing server 20 as templates having color distribution data specified by C1 as the color distribution ID. Templates T11 and T16 have the same color distribution data, but, since they are different templates, their layouts and color placements differ. It should be noted that although the color distribution data from C1 to C3 indicates a color having the highest frequency of appearance in the template, the data that is to be held as the color distribution data need not necessarily be indicative of the color having the highest frequency of occurrence. For example, the frequencies of appearance of multiple colors may be stipulated, as in the manner of the color distribution data of ID C4.

By using a color distribution table of the kind shown in FIG. 16, it is possible to select a template having an impression evaluation value for which the discrepancy with respect to the impression evaluation value of a target image selected by the user is less than a threshold value. For example, if the discrepancy between the impression evaluation value of the selected target image and the impression evaluation value corresponding to the color distribution data whose color distribution ID is C1 is less than a threshold value, then the CPU 21 will select templates T11 and T16 as the templates with which the selected target image is to be combined.

Multiple templates for which the color distribution data contained in the color distribution table is the same may be generated anew by the CPU 21 (template generating unit) of the image compositing server 20. A generated template is stored on the hard disk 28 of the image compositing server 20 and the template ID of this template is also stored in the color distribution table. In a case where a template corresponding to color distribution data has not been stored in the image compositing server 20, the template ID need not be stored in correspondence with the color distribution data. In a case where the discrepancy between an impression evaluation value that corresponds to color distribution data for which a template ID has not been stored in the color distribution table and the impression evaluation value of a target image is less than a threshold value, a template having such color distribution data is generated by the CPU 21 of the image compositing server 20. Further, it may be arranged so that the CPU 21 of the image compositing server 20 calculates color distribution data with regard to multiple templates and stores impression evaluation values of the templates in the color distribution table in correspondence with the color distribution data. In this case, when a new template is added to the system, an impression evaluation value can be found automatically through calculation of color distribution data and can be stored even if the impression evaluation value of the template is not stored directly.

FIGS. 17 to 21 illustrates another embodiment. Here a plurality of images are combined with a template in which multiple image combining areas have been defined.

Figure 17:
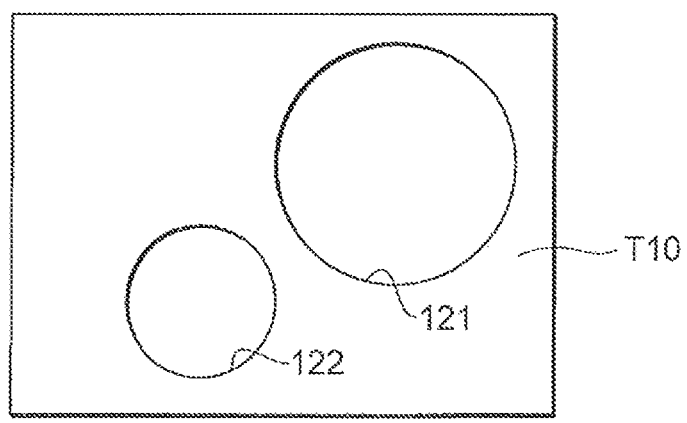
FIG. 17 is an example of a template.

FIG. 17 is an example of a template T10.

Multiple image combining areas 121 and 122 have been defined in the template T10. Target images selected by the user are combined with the image combining areas 121 and 122.

Figure 18:
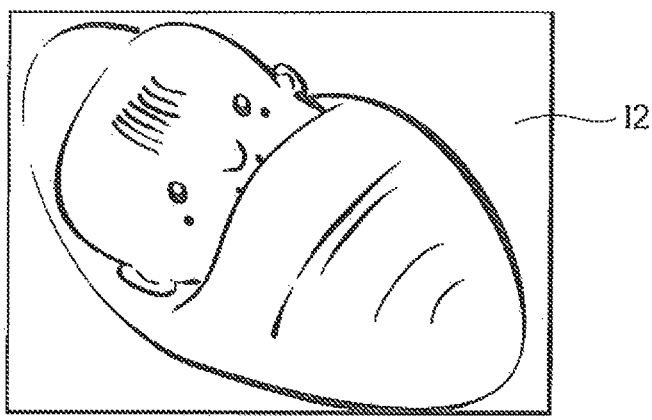
FIGS. 18 and 19 are examples of target images.
Figure 19:
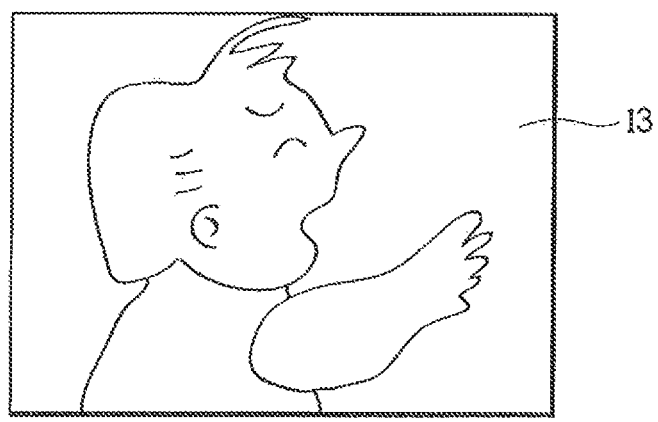

FIGS. 18 and 19 are examples of target images selected by the user.

FIG. 18 shows a target image I2 of a baby, and FIG. 19 shows a target image I3 of a child.

Figure 20:
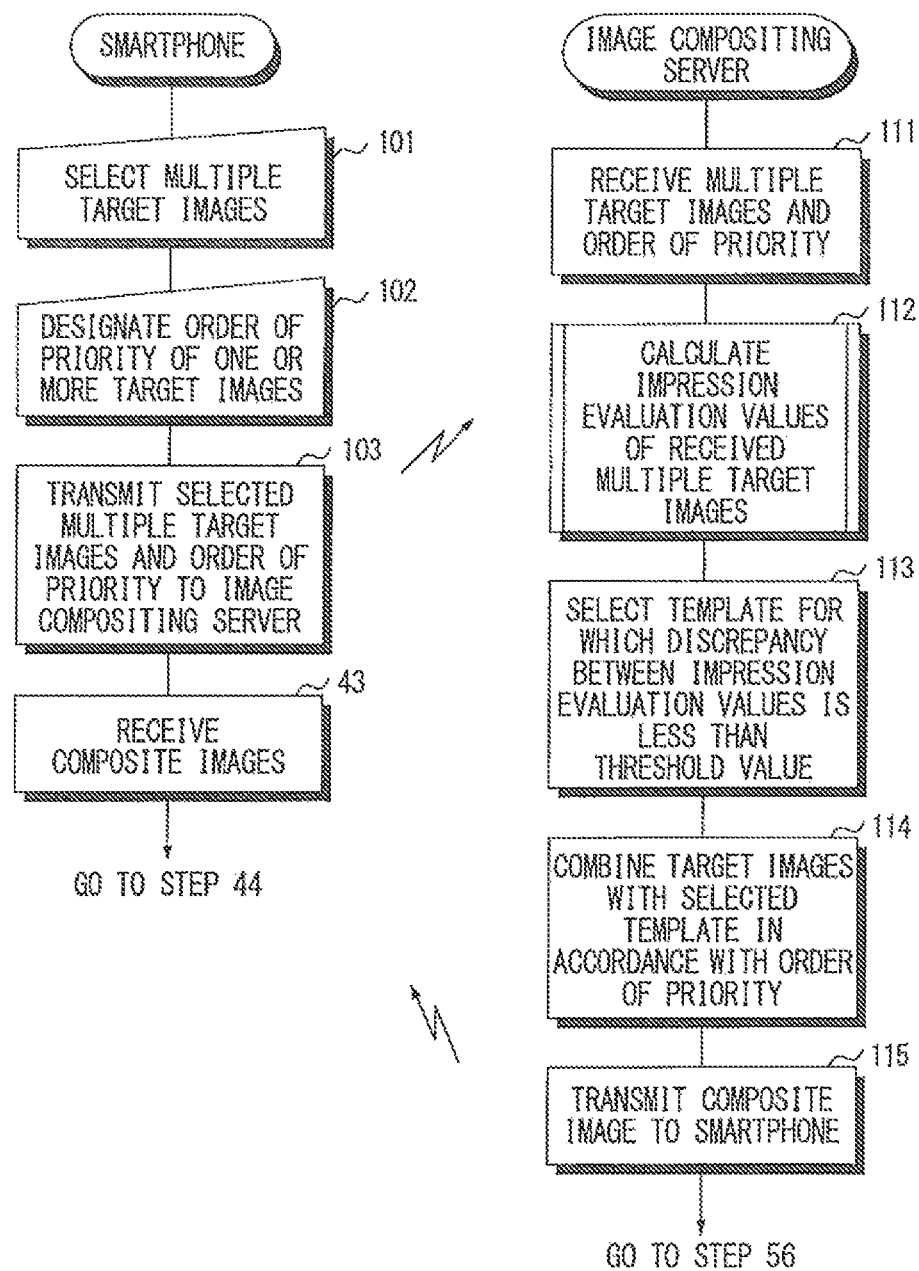
FIG. 20 is a flowchart illustrating processing executed by the image compositing system.

FIG. 20 is a flowchart that corresponds to the processing shown in FIG. 6 and illustrates processing executed by the image compositing system.

Using the smartphone 1, the user selects multiple target images (step 101).

The user designates the order of priority of one or more target images from the multiple target images I2 and I3 selected (step 102). For example, the target images I2 and I3 are displayed on the display screen 60 of the smartphone 1 and the order of priority thereof is designated by touching the target images I2 and I3 in an order that is in accordance with the order of priority. Further, by touching only target image I2 or I3, the order of priority is decided such that the touched target image takes on a priority higher than that of the untouched target image. In response, image data representing the multiple images selected and data representing the order of priority are transmitted from the smartphone 1 to the image compositing server 20 (step 103).

When the image data representing the multiple images and the data representing the order of priority transmitted from the smartphone 1 are received by the communication unit 26 (priority acceptance unit) of the image compositing server 20 (step 111), impression evaluation values are calculated with regard to respective ones of the images of the multiple target images received (step 112). The CPU 21 selects a template having an impression evaluation value for which the discrepancy with respect to the impression evaluation value of each of the images of the multiple target images is less than a threshold value (step 113). Naturally, it may be arranged so that the average of impression evaluation values regarding respective ones of the images of the multiple target images is calculated and the CPU 21 selects the template having the impression evaluation value for which the discrepancy with respect to the calculated average impression evaluation value is less than a threshold value.

When a template is selected, (it is assumed here that template T10 shown in FIG. 17 has been selected), the target images are combined with the selected template in accordance with the order of priority (step 114). It is assumed here that the target image I2 of the baby shown in FIG. 18 has been designated to have a higher order of priority than that of the target image I3 of the child shown FIG. 19. Accordingly, the target image I2 of the baby having the higher order of priority is combined with the large-size image combining area 121 of the image combining areas 121 and 122 on the selected template T10. The target image I3 of the child is combined with the image combining area 122, which is smaller than the image combining area 121 (see FIG. 21). As a result, the target images I2 and I3 are combined with the large-size image combining area on the selected template in accordance with the designated order of priority. Composite image data representing the generated composite image is transmitted from the image compositing server 20 to the smartphone 1 (step 115).

Figure 21:
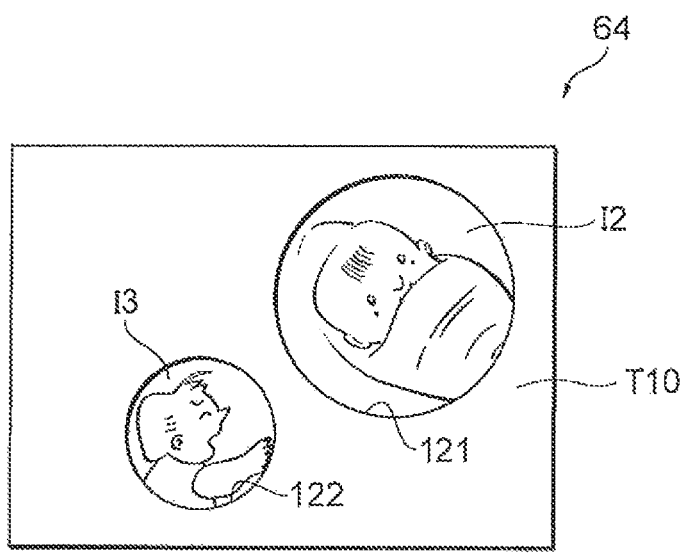
FIG. 21 is an example of a composite image.

When the composite image data transmitted from the image compositing server 20 is received by the smartphone 1 (step 43), a composite image 64, which is the result of combining the target image I2 of the baby and the target image I3 of the child with the image combining areas 121 and 122, respectively, is displayed on the display screen 60 of the smartphone 1, as illustrated in FIG. 21.

Rather than displaying target images in accordance with priority in order of decreasing size of the image combining areas, it may be arranged so as to combine a target image with an image combining area having a high priority because it is near the center of the template, or to combine a target image with an image combining area having a higher priority the more leftward the image combining area is among multiple image combining areas formed in the template.

Figure 22:
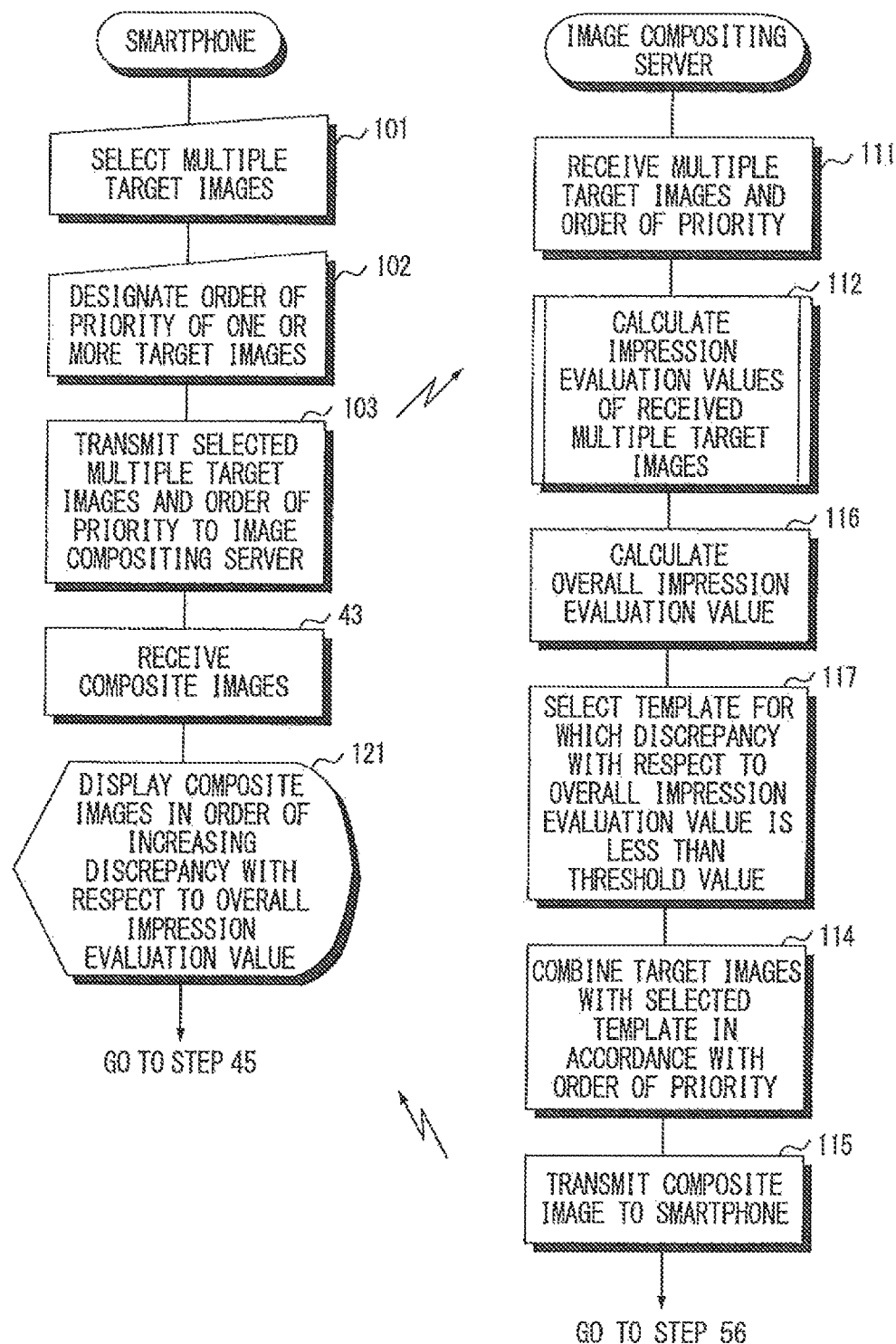
FIG. 22 is a flowchart illustrating processing executed by the image compositing system.

FIG. 22, which shows another embodiment, is a flowchart illustrating processing executed by the image compositing system. The processing illustrated in FIG. 22 corresponds to FIG. 20 and processing steps identical with those shown in FIG. 20 are designated by like step numbers.

Multiple target images are selected (step 101) and the order of priority of one or more target images is designated (step 102), whereupon image data representing the multiple images selected and data representing the order of priority are transmitted from the smartphone 1 to the image compositing server 20 (step 103).

When the image data representing the multiple images and the data representing the order of priority transmitted from the smartphone 1 are received by the image compositing server 20 (step 111), impression evaluation values are calculated with regard to respective ones of the images of the multiple target images received (step 112). From the impression evaluation values regarding the multiple target images, the CPU 21 (overall target image impression evaluation value calculation unit) calculates an overall impression evaluation value representing the overall evaluation of the multiple impression evaluation values regarding the multiple target images (step 116). The overall impression evaluation value is the sum, product, average, etc., of the multiple impression evaluation values regarding the multiple target images. The CPU 21 selects a template having an impression evaluation value for which the discrepancy with respect to the thus calculated overall impression evaluation value is less than a threshold value (step 117). In the calculation of the overall impression evaluation value, it may be arranged so as to calculate the overall target image impression evaluation value upon weighting an impression evaluation value, wherein the higher the priority of a target image the priority of which has been designated by the user, the greater the weighting applied.

The target images are combined with the selected template in accordance with the order of priority, whereby a composite image is generated (step 114). Composite image data representing the generated composite image is transmitted from the image compositing server 20 to the smartphone 1 (step 115).

When the composite image data transmitted from the image compositing server 20 is received by the smartphone 1 (step 43), composite images whose templates are utilizing an impression evaluation value having a small discrepancy with respect to the overall impression evaluation value are displayed on the display screen 60 of the smartphone 1 in regular order (step 121).

In the foregoing embodiments, persons are included as target images. However, a target image, such as scenery or the like, that does not include a person may be selected. In a case where impression evaluation values for gender, age, expression, face orientation and the like are calculated with regard to a target image that does not include a person, an impression evaluation value for gender is calculated from an impression of masculinity or femininity received from the target image that is devoid of a person. For example, if a target image is one containing a scene of grandeur, the target image is deemed to be a masculine image and the impression evaluation value for gender (masculinity) rises. If a target image is a pretty image such as a field of flowers, the target image is deemed to be a feminine image and the impression evaluation value for gender (masculinity) declines. With regard to age, an impression evaluation value can be calculated depending upon whether the target image is one containing scenery that would be liked by a young person or one containing scenery that would be liked by an elderly person. With regard to expression, an impression evaluation value can be calculated upon estimating the expression of the user who has seen the target image. With regard to face orientation, an impression evaluation value can be calculated depending upon whether a forward-facing face or sideways-facing face would be suitable if a person were to be combined with the target image.

Further, impressions are not limited to gender, age, expression and face orientation; other impressions that can be utilized are cute, gentle, bracing and chic. Furthermore, in the foregoing embodiments, the template selected is one having an impression evaluation value for which the discrepancy with respect to the impression evaluation value of a target image is less than a threshold value. However, even if it is arranged so as to calculate the degree of approximation between the impression evaluation value of a target image and the impression evaluation value of a template based upon the inverse of discrepancy, for example, and select a template for which the calculated degree of approximation is equal to or greater than a threshold value, the processing would be essentially the same as that described above.

In the foregoing embodiments, a template is selected while the smartphone 1 and image compositing server 20 communicate with each other. However, such communication is not necessarily required. The above-described processing can be implemented also in a case where a composite image is generated by a single personal computer or store terminal device or the like.

As many apparently widely different embodiments of the present invention can be made without departing from the spirit and scope thereof, it is to be understood that the invention is not limited to the specific embodiments thereof except as defined in the appended claims.

What is claimed is:

1. A template selection system comprising: a processor communicatively coupled to a memory, said processor configured to store template impression evaluation values with regard to multiple templates;
   calculate an impression evaluation value of a target image to be combined with a template; and
   select templates in order of increasing discrepancy between stored multiple template impression evaluation values and a calculated target image impression evaluation value, wherein said processor further generates composite images by combining the target image with the selected templates, and causes generated composite images to be displayed on a display screen of a display unit in order of increasing discrepancy between impression evaluation values of templates used in the composite images and the target image impression evaluation value, wherein a user designates one or more of the generated composite images to complete generation of the designated composite images and to display the completed composite images on the display screen of the display unit.

2. The system according to claim 1, wherein said processor selects a template having a template impression evaluation value, from among the stored multiple template impression evaluation values, for which the discrepancy with respect to the calculated target image impression evaluation value is less than a threshold value.

3. The system according to claim 1, wherein said processor further causes selected templates to be displayed on a display screen of a display unit.

4. The system according to claim 3, wherein said processor causes selected templates to be displayed on the display screen of said display unit in order of increasing discrepancy between the stored multiple template impression evaluation values and the calculated target image impression evaluation value.

5. The system according to claim 1, wherein said processor
   detects a face of a person included in the target image; and
   calculates an impression evaluation value of the detected face of the person.

6. The system according to claim 5, wherein said processor calculates, from the detected face of the person, an impression evaluation value with regard to at least one among gender, age, expression and face orientation of the person.

7. The system according to claim 1, wherein said processor
   detects a person included in the target image; and
   calculates an impression evaluation value of the detected person.

8. The system according to claim 7, wherein said processor calculates, from the detected person, an impression evaluation value with regard to vitality of the person.

9. The system according to claim 1, wherein said processor
   calculates impression evaluation values of two or more types as vectors with regard to the target image; and
   stores impression evaluation values of two or more types as vectors with regard to a template; and
   wherein said discrepancy with respect to the template is the vector-to-vector distance between the target image impression evaluation value and the impression evaluation value of the template.

10. The system according to claim 1, wherein said processor stores template color distribution data with regard to multiple templates and stores template impression evaluation values in correspondence with the template color distribution data.

11. The system according to claim 10, wherein said processor generates multiple templates for which the template color distribution data is identical.

12. The system according to claim 1, wherein said processor calculates color distribution data with regard to multiple templates and stores template impression evaluation values in correspondence with the color distribution data.

13. The system according to claim 1, wherein said processor
   calculates impression evaluation values regarding respective ones of multiple target images;
   calculates, from multiple impression evaluation values regarding the multiple calculated target images, an overall impression evaluation value representing overall evaluation of the multiple impression evaluation values regarding the multiple target images; and
   uses the overall impression evaluation value as an impression evaluation value of a target image, which is a target for which discrepancies are to be found with respect to the stored impression evaluation values of multiple templates.

14. The system according to claim 13, wherein said processor
   accepts, from among multiple target images, order of priority of one or more target images to be combined with a template; and
   calculates an overall target image impression evaluation value upon weighting an impression evaluation value, wherein the higher the priority of a target image the priority of which has been accepted by said priority acceptance unit, the greater the weighting applied.

15. The system according to claim 1, wherein said processor
   accepts, from among multiple target images in a case where multiple target images exist, order of priority of one or more target images to be combined with a template; and
   combines one or more images with the selected template, in accordance with the accepted order of priority.

16. The system according to claim 15, wherein said processor combines the one or more target images with image combining areas in the selected template in accordance with a designated order of priority.

17. A template selection method comprising steps of: —storing template impression evaluation values with regard to multiple templates; calculating an impression evaluation value of a target image to be combined with a template; selecting templates in order of increasing discrepancy between stored multiple template impression evaluation values and a calculated target image impression evaluation value; generating composite images by combining the target image with the selected templates; and displaying generated composite images to be displayed on a display screen of a display unit in order of increasing discrepancy between impression evaluation values of templates used in the composite images and the target image impression evaluation value, wherein a user designates one or more of the generated composite images to complete generation of the designated composite images and to display the completed composite images on the display screen of the display unit.

18. A non-transitory recording medium storing a computer-readable program for controlling the computer of a template selection system so as to: store template impression evaluation values with regard to multiple templates; calculate an impression evaluation value of a target image to be combined with a template; select templates in order of increasing discrepancy between stored multiple template impression evaluation values and a calculated target image impression evaluation value; generate composite images by combining the target image with the selected templates; and display generated composite images to be displayed on a display screen of a display unit in order of increasing discrepancy between impression evaluation values of templates used in the composite images and the target image impression evaluation value, wherein a user designates one or more of the generated composite images to complete generation of the designated composite images and to display the completed composite images on the display screen of the display unit.

* * * * *